United States Patent
Donate et al.

(10) Patent No.: US 11,421,117 B2
(45) Date of Patent: Aug. 23, 2022

(54) AZEOTROPIC AND PSEUDOAZEOTROPIC BLENDS

(71) Applicant: Dow Global Technologies LLC, Midland, MI (US)

(72) Inventors: Felipe A. Donate, Midland, MI (US); Rebecca J. Wachowicz, Bay City, MI (US)

(73) Assignee: Dow Global Technologies LLC, Midland, MI (US)

( * ) Notice: Subject to any disclaimer, the term of this patent is extended or adjusted under 35 U.S.C. 154(b) by 412 days.

(21) Appl. No.: 16/744,604

(22) Filed: Jan. 16, 2020

(65) Prior Publication Data

US 2020/0231825 A1   Jul. 23, 2020

Related U.S. Application Data

(60) Provisional application No. 62/795,926, filed on Jan. 23, 2019.

(51) Int. Cl.
| | | |
|---|---|---|
| *C09D 7/20* | (2018.01) | |
| *C09D 133/00* | (2006.01) | |
| *C09D 163/00* | (2006.01) | |
| *C09D 133/02* | (2006.01) | |
| *C09D 133/08* | (2006.01) | |

(52) U.S. Cl.
CPC .............. *C09D 7/20* (2018.01); *C09D 133/00* (2013.01); *C09D 163/00* (2013.01)

(58) Field of Classification Search
CPC combination set(s) only.
See application file for complete search history.

(56) References Cited

U.S. PATENT DOCUMENTS

| | | |
|---|---|---|
| 4,155,865 A | 5/1979 | Ostrozynski et al. |
| 4,157,976 A | 6/1979 | Ostrozynski et al. |
| 5,454,970 A | 10/1995 | Flaningam et al. |
| 5,454,972 A | 10/1995 | Williams et al. |
| 5,456,856 A | 10/1995 | Flaningam et al. |
| 5,478,493 A | 12/1995 | Flaningam et al. |
| 5,501,811 A | 3/1996 | Flaningam et al. |
| 5,507,878 A | 4/1996 | Flaningam et al. |
| 5,628,833 A | 5/1997 | McCormack et al. |
| 5,824,632 A | 10/1998 | Flaningam et al. |
| 5,834,416 A | 11/1998 | Morgan et al. |
| 7,897,558 B1 | 3/2011 | Arafat |
| 2014/0065432 A1 | 3/2014 | Wuerch et al. |
| 2018/0148605 A1 | 5/2018 | Girardeau et al. |

FOREIGN PATENT DOCUMENTS

JP              06136389 A  *  5/1994  ........... C11D 7/5031

OTHER PUBLICATIONS

Machine translation of JP 06-136389 A (Year: 1994).*
Sigma-Aldrich, Propylene glycol monomethyl ether acetate data sheet. (Year: 2022).*
"Dow Corning OS Fluids Selection Guide", Dow Corning Technical Data Sheet, Form No. 10-725-97, (1997).
"Dow Corning OS-10, OS-20 and OS-30 Fluids", Dow Corning Technical Data Sheet, Form No. 10-1198B-01, (2001).
Dow Corning Technical Data Sheet "Xiameter™ Brand Silicone Fluids for the Personal Care Industry", Form No. 95-1166-01, (2013).
W. Finzel, J. of Coatings Tech., vol. 68, No. 852, 1996, pp. 69-72.
Reichhold Product Bulleting for Beckosol 10-060, 2001, pp. 1-2.

* cited by examiner

*Primary Examiner* — Ramsey Zacharia

(57) ABSTRACT

The present invention relates to azeotropic blends and pseudoazeotropic blends and to coating compositions including such blends. In one aspect, an azeotropic blend or a pseudoazeotropic blend consists essentially of octamethyltrisiloxane and a second component selected from the following: amyl acetate, 2-propoxyethanol, 1-methoxy-2-propylacetate, and 1-propoxy-2-propanol.

6 Claims, No Drawings

AZEOTROPIC AND PSEUDOAZEOTROPIC BLENDS

CROSS-REFERENCE TO RELATED APPLICATION

This application claims the benefit of U.S. Provisional Patent Application No. 62/795,926, filed Jan. 23, 2019, which is incorporated by reference herein in its entirety.

FIELD

The present invention relates to azeotropic blends or pseudoazeotropic blends that can be used, for example in coating compositions.

INTRODUCTION

Since the 1970s, paints and coatings formulators have struggled to meet volatile organic compound ("VOC") guidelines enacted by the United States Environmental Protection Agency (EPA) which have been getting more stringent in recent years. Among the approaches used by formulators to reduce the VOC content of their products is the replacement of VOC solvents (e.g., toluene and xylene) with VOC-exempt solvents. Water is a VOC-exempt solvent used in waterborne coatings such as common house latex paints. Acetone, t-butyl acetate, methyl acetate, and p-chlorobenzotrifluoride (PCBTF) are VOC-exempt solvents that are used in solvent-based coatings. Other examples of VOC-exempt solvents are volatile methyl siloxanes ("VMS"), which are relatively low molecular weight linear or cyclic compounds bearing fully methylated silicon atoms bridged by oxygen atoms.

Mixtures of liquids may exhibit "ideal" or "non-ideal" behavior depending on the degree of association or interaction between the components. In an ideal mixture, two liquids with different boiling points have little or no association, and as a result, the partial pressure exerted by each component over the solution at a given temperature is proportional to their mole fractions in the solution, and the total vapor pressure of this ideal solution is the sum of the partial vapor pressures. This relationship is known as Raoult's law. Therefore, mixtures of the two components would have boiling points intermediate between the boiling points of the two pure components. On the other hand, the components of non-ideal mixtures display significant association resulting in deviations from Raoult's law. Positive deviations result in mixture compositions that have boiling points higher than either of the pure components, and negative deviations result in mixture compositions that have boiling points lower than either of the pure components. Such mixtures are termed azeotropes and their compositions do not change with distillation. These mixtures evaporate with a constant composition, effectively behaving as a single component. This property makes them useful when trying to substitute a given VOC solvent.

It would be desirable to have new azeotropes and pseudoazeotropes, and in particular, to have new azeotropes and pseudoazeotropes that can potentially be used in paints and other coating compositions with reduced VOC content.

SUMMARY

The present invention provides azeotropes and pseudoazeotropes. In some embodiments, the azeotropes and pseudoazeotropes are binary mixtures. In some aspects, the azeotropes and pseudoazeotropes can be used in paints or other coating compositions and advantageously provide a reduced VOC content as compared to existing solvents.

In one aspect, the present invention provides an azeotropic blend or a pseudoazeotropic blend consisting essentially of octamethyltrisiloxane and a second component selected from the following: amyl acetate, 2-propoxyethanol, 1-methoxy-2-propylacetate, and 1-propoxy-2-propanol.

In another aspect, the present invention provides a coating composition comprising any of the azeotropic blends or pseudoazeotropic blends disclosed herein.

These and other embodiments are described in more detail in the Detailed Description.

DETAILED DESCRIPTION

As used herein, "a," "an," "the," "at least one," and "one or more" are used interchangeably.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include one or more additional compounds unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or", unless stated otherwise, refers to the listed members individually as well as in any combination. Use of the singular includes use of the plural and vice versa.

Also herein, the recitations of numerical ranges by endpoints include all numbers subsumed in that range (e.g., 1 to 5 includes 1, 1.5, 2, 2.75, 3, 3.80, 4, 5, etc.). For the purposes of the invention, it is to be understood, consistent with what one of ordinary skill in the art would understand, that a numerical range is intended to include and support all possible subranges that are included in that range. For example, the range from 1 to 100 is intended to convey from 1.01 to 100, from 1 to 99.99, from 1.01 to 99.99, from 40 to 60, from 1 to 55, etc.

Unless stated to the contrary, implicit from the context, or customary in the art, all parts and percents are based on weight and all test methods are current as of the filing date of this disclosure.

"Azeotropic" and like terms mean a blend of two or more components that boil or distill as a single component at a given temperature and pressure while the liquid and the vapor concentrations are the same. "Pseudo-azeotropic" and like terms mean a blend of two or more components that boils or evaporates closely, but not exactly, like a single component, i.e., the solvent system sufficiently approximates an azeotropic system so as to allow it to be used as an azeotropic system. Both azeotropic and pseudo-azeotropic blends have boiling points lower than either of the pure components used in the blend. Unless stated otherwise herein, the determination of whether a blend is azeotropic or pseudo-azeotropic is based on boiling points at 720 mm mercury (mm Hg).

"Solvent" and like terms mean a substance that is capable of dissolving another substance (i.e., a solute) to form an essentially uniformly dispersed mixture (i.e., solution) at the molecular or ionic size level.

"Hydrocarbon" and like terms mean a compound consisting only of carbon and hydrogen atoms.

"Solution" and like terms mean a homogeneous composition that is (1) variable, i.e., can exist in different concentrations of solute in solvent, (2) all but one component is present in simplest units, e.g., molecules, and (3) can be separated by physical methods into two or more pure substances. In the context of this invention, solution refers to liquid compositions.

"Composition" and like terms mean a mixture or blend of two or more components.

Embodiments of the present invention generally relate to azeotropic blends or pseudoazeotropic blends consisting essentially of octamethyltrisiloxane and a second component selected from the following: amyl acetate, 2-propoxyethanol, 1-methoxy-2-propylacetate, and 1-propoxy-2-propanol.

In some embodiments, the azeotropic blend or pseudoazeotropic blend consists essentially of octamethyltrisiloxane and amyl acetate. In some embodiments, the blend consists of octamethyltrisiloxane and amyl acetate. The boiling point of the blend, in some embodiments, is less than the boiling point of octamethyltrisiloxane and less than the boiling point of amyl acetate at 720 mm Hg. In some such embodiments comprising amyl acetate, the blend comprises 20 to 50 weight percent octamethyltrisiloxane based on the total weight of the blend.

In some embodiments, the azeotropic blend or pseudoazeotropic blend consists essentially of octamethyltrisiloxane and 2-propoxyethanol. In some embodiments, the blend consists of octamethyltrisiloxane and 2-propoxyethanol. The boiling point of the blend, in some embodiments, is less than the boiling point of octamethyltrisiloxane and less than the boiling point of 2-propoxyethanol at 720 mm Hg. In some such embodiments comprising 2-propoxyethanol, the blend comprises 20 to 80 weight percent octamethyltrisiloxane based on the total weight of the blend.

In some embodiments, the azeotropic blend or pseudoazeotropic blend consists essentially of octamethyltrisiloxane and 1-methoxy-2-propylacetate. In some embodiments, the blend consists of octamethyltrisiloxane and 1-methoxy-2-propylacetate. The boiling point of the blend, in some embodiments, is less than the boiling point of octamethyltrisiloxane and less than the boiling point of 1-methoxy-2-propylacetate at 720 mm Hg. In some such embodiments comprising 1-methoxy-2-propylacetate, the blend comprises 20 weight percent or less octamethyltrisiloxane based on the total weight of the blend.

In some embodiments, the azeotropic blend or pseudoazeotropic blend consists essentially of octamethyltrisiloxane and 1-propoxy-2-propanol. In some embodiments, the blend consists of octamethyltrisiloxane and 1-propoxy-2-propanol. The boiling point of the blend, in some embodiments, is less than the boiling point of octamethyltrisiloxane and less than the boiling point of 1-propoxy-2-propanol at 720 mm Hg. In some such embodiments comprising 1-propoxy-2-propanol, the blend comprises 20 to 50 weight percent octamethyltrisiloxane based on the total weight of the blend.

Embodiments of the present invention also relate to coating compositions. A coating composition of the present invention comprises any of the azeotropic blends or pseudoazeotropic blends disclosed herein.

Blends

Blends according to embodiments of the present invention advantageously behave as azeotropes or pseudoazeotropes. The azeotropic blends and pseudoazeotropic blends of the present invention consist essentially of, or consist of, a first component and a second component. The first component is octamethyltrisiloxane. The second component is amyl acetate, 2-propoxyethanol, 1-methoxy-2-propylacetate, or 1-propoxy-2-propanol. The first and second components form the blend. The blend can be used as a solvent in some embodiments. Thus, some embodiments of the present invention relate to solvents that consist essentially of, or consist of, octamethyltrisiloxane and a second component selected from the following: amyl acetate, 2-propoxyethanol, 1-methoxy-2-propylacetate, and 1-propoxy-2-propanol.

The first component in the blend is octamethyltrisiloxane. Octamethyltrisiloxane is commercially available from The Dow Chemical Company as XIAMETER™ PMX-200 silicone fluid, 1.0 cSt (centistokes). As set forth further herein, the amount of octamethyltrisiloxane used in embodiments of the present invention depends on the second component used (e.g., amyl acetate, 2-propoxyethanol, 1-methoxy-2-propylacetate, and 1-propoxy-2-propanol).

In some embodiments, the second component is amyl acetate. Amyl acetate is commercially available from The Dow Chemical Company and a variety of other manufacturers. In some such embodiments, the blend or solvent consists essentially of octamethyltrisiloxane and amyl acetate. In some such embodiments, the blend or solvent consists of octamethyltrisiloxane and amyl acetate. In embodiments where the second component is amyl acetate, the blend comprises 20 to 50 weight percent octamethyltrisiloxane based on the total weight of the blend. The blend or solvent, in some embodiments, consists essentially of 20 to 50 weight percent octamethyltrisiloxane and 50 to 80 weight percent amyl acetate, based on the total weight of the blend. The blend or solvent, in some embodiments, consists of 20 to 50 weight percent octamethyltrisiloxane and 50 to 80 weight percent amyl acetate, based on the total weight of the blend.

In some embodiments, the second component is 2-propoxyethanol. 2-propoxyethanol is commercially available from The Dow Chemical Company as Propyl CELLOSOLVE™. In some such embodiments, the blend or solvent consists essentially of octamethyltrisiloxane and 2-propoxyethanol. In some such embodiments, the blend or solvent consists of octamethyltrisiloxane and 2-propoxyethanol. In embodiments where the second component is 2-propoxyethanol, the blend comprises 20 to 80 weight percent octamethyltrisiloxane based on the total weight of the blend. The blend or solvent, in some embodiments, consists essentially of 20 to 80 weight percent octamethyltrisiloxane and 20 to 80 weight percent 2-propoxyethanol, based on the total weight of the blend. The blend or solvent, in some embodiments, consists of 20 to 80 weight percent octamethyltrisiloxane and 20 to 80 weight percent 2-propoxyethanol, based on the total weight of the blend.

In some embodiments, the second component is 1-methoxy-2-propylacetate. 1-methoxy-2-propylacetate is commercially available from The Dow Chemical Company as DOWANOL™ PMA. In some such embodiments, the blend or solvent consists essentially of octamethyltrisiloxane and 1-methoxy-2-propylacetate. In some such embodiments, the blend or solvent consists of octamethyltrisiloxane and 1-methoxy-2-propylacetate. In embodiments where the second component is 1-methoxy-2-propylacetate, the blend comprises 20 weight percent or less octamethyltrisiloxane based on the total weight of the blend. The blend or solvent, in some embodiments, consists essentially of 20 weight percent or less octamethyltrisiloxane and 80 weight percent or greater 1-methoxy-2-propylacetate, based on the total weight of the blend. The blend or solvent, in some embodiments, consists of 20 weight percent or less octamethyltrisiloxane and 80 weight percent or greater 1-methoxy-2-propylacetate, based on the total weight of the blend.

In some embodiments, the second component is 1-propoxy-2-propanol. 1-propoxy-2-propanol is commercially available from The Dow Chemical Company as DOWANOL™ PnP. In some such embodiments, the blend or solvent consists essentially of octamethyltrisiloxane and 1-propoxy-2-propanol. In some such embodiments, the blend or solvent consists of octamethyltrisiloxane and 1-propoxy-2-propanol. In embodiments where the second component is 1-propoxy-2-propanol, the blend comprises 20 to 50 weight percent octamethyltrisiloxane based on the total weight of the blend. The blend or solvent, in some embodiments, consists essentially of 20 to 50 weight percent octamethyltrisiloxane and 50 to 80 weight percent 1-propoxy-2-propanol, based on the total weight of the blend. The blend or solvent, in some embodiments, consists of 20 to 50 weight percent octamethyltrisiloxane and 50 to 80 weight percent 1-propoxy-2-propanol, based on the total weight of the blend.

Blends or solvents according to embodiments of the present invention can be prepared using techniques known to those of skill in the art based on the teachings herein.

Coating Compositions

Some embodiments of the present invention relate to coating compositions. Coating compositions of the present invention comprise, in various embodiments, any azeotropic blend or pseuodoazeotropic blend disclosed herein. The azeotropic and pseudoazeotropic blends can be solvents in such coating compositions.

Examples of coating compositions that can incorporate an azeotropic blend or pseudoazeotropic blend of the present invention as a solvent include, without limitation, paints (e.g., house paints, asphalt paints, industrial paints, etc.), paints used to coat metal, and other coatings. For example, the azeotropic and pseudoazeotropic blends can be used to replace other solvents typically used in such coating compositions (e.g., paints) such as p-chlorobenzotrifluoride (PCBTF), n-butyl acetate, methyl acetate, acetone, toluene, and others.

Persons of ordinary skill in the art can readily modify typical coating compositions to incorporate the inventive azeotropic or pseudoazeotropic blends as solvents based on the teachings herein. In addition to solvent, typical coating compositions also include polymeric binders, pigments, and other additives. Examples of such coating compositions can be found in W. Finzel, "Volatile Methylsiloxanes as Exempt Solvents in Protective Coatings", J. of Coatings Technology, Vol. 68, No. 852, pp. 69-72 (January 1996); US Patent Publication No. 2018/0148605; US Patent Publication No. 2014/0065432 and Product Bulletin from Reichhold for Beckosol 10-060.

Coating compositions of the present invention can be prepared using techniques known to those having ordinary skill in the art based on the teachings herein.

Some embodiments of the invention will now be described in detail in the following Examples.

EXAMPLES

The following examples are given to illustrate the invention and should not be construed as limiting its scope. All parts and percentages are by weight unless otherwise indicated.

A number of components are blended with octamethyltrisiloxane. The octamethyltrisiloxane used is XIAMETER™ PMX-200 silicone fluid, 1.0 cSt (centistokes) from the Dow Chemical Company. The components evaluated as part of a binary blend with octamethyltrisiloxane are: amyl acetate (from The Dow Chemical Company), n-butyl propionate (UCAR™ n-Butyl Propionate from The Dow Chemical Company), 2-propoxyethanol (Propyl CELLU-SOLVE™ from The Dow Chemical Company), 1-methoxy-2-propylacetate (DOWANOL™ PMA from The Dow Chemical Company), and 1-propoxy-2-propanol (DOWANOL™ PnP from The Dow Chemical Company).

Boiling Point Measurements

The boiling measurements of the pure components and the blends are measured as follows. In a typical experiment, 15 grams of the pure solvent or solvent blend to be tested is added to a single neck, 50 mL round bottom flask equipped with a built-in thermocouple well. A small Teflon stir bar is added to the flask and the flask is secured on a ring stand with a clamp. A heating mantle is attached to the flask and a magnetic stir plate is placed beneath the mantle. Control and high limit thermocouples leading from a digital temperature controller are placed between the mantle and the flask. Another thermocouple is placed inside the thermocouple well. A condenser is attached to the flask and an adapter leading to a nitrogen-vacuum line is placed on the condenser. The stir plate is turned on low speed. Dry ice is added to the vacuum trap and the vacuum pump turned on. The pressure is adjusted to the desired value by means of a Tescom backpressure regulator and nitrogen flow from a 5 psig nitrogen line. The pressure is read with a digital Rosemount gauge. The system had a relief valve in place so that over pressurization would not occur. The pressure in the apparatus is initially reduced to about 10 mmHg and then increased to about 760 mmHg with nitrogen. After this initial purging of air, the pressure is set to 720 mm Hg. The temperature controller is turned on and the mantle temperature increased gradually in small increments until the liquid in the flask is observed to boil and a reflux is established. The temperature of the boiling liquid measured at the thermocouple well is recorded as the boiling point.

The boiling points of the neat XIAMETER™ PMX-200 fluid and of the neat second solvent (second component) of interest are measured before measuring the boiling point of blends. Blends are made up with the following weight percent compositions: 80/20 XIAMETER™ PMX-200 fluid (24.00±0.03 g) and second solvent (6.00±0.03 g); 50/50 XIAMETER™ PMX-200 fluid (15.00±0.03 g) and second solvent (15.00±0.03 g); and 20/80 XIAMETER™ PMX-200 fluid (6.00±0.03 g) and second solvent (24.00±0.03 g). Each blend made is labeled and stirred briefly to achieve solubility. For the boiling point determination, 15.00±0.03 g of blend was used.

The results are shown in Table 1.

TABLE 1

| Second Component (Second Solvent) | Boiling Point of Second Component (° C.) | Boiling Point (° C) of XIAMETER™ PMX-200 blend at Given Weight % of XIAMETER™ fluid | | | |
|---|---|---|---|---|---|
| | | 100% | 80% | 50% | 20% |
| Amy Acetate | 145 | 151.4 | 146 | 144* | 144* |
| n-Butyl Propionate | 143 | 151.4 | 147 | 144 | 144 |
| 2-propoxyethanol | 150 | 151.4 | 140* | 140* | 143* |
| 1-methoxy-2-propylacetate | 135 | 151.4 | 143 | 135 | 129* |
| 1-propoxy-2-propanol | 149 | 151.4 | 143 | 143* | 145* |

The blends marked with an asterisk (*) represent inventive azeotropic blends according to some embodiments of the present invention.

Solubility of Acrylic and Epoxy Resins in the Inventive Azeotropic Blends

To demonstrate the potential use of the inventive azeotropic blends in coating formulations, their compatibility with three common resins is evaluated at a theoretical concentration of 10% resin (weight of resin per volume of solvent, w/v). The resins used are: PARALOID™ B-66 100% acrylic resin (The Dow Chemical Company), PARALOID™ B-72 100% acrylic resin (The Dow Chemical Company), and DER® 331 epoxy resin (Olin Corporation). The resin (0.50±0.03 g) is weighed into a 16 mL vial, and 5.0 ml of the specified azeotropic blend is pipetted into the vial, which is then capped with a polyethylene-lined lid and labeled appropriately. This procedure is repeated with each of the resins and the azeotropic blends evaluated. The vials are placed in an Eberbach shaker on low setting. After 24 hours, the vials are removed from the shaker and allowed to sit on a lab bench for 30 minutes before they are visually rated as soluble or insoluble. The ratings are summarized in Table 2.

TABLE 2

| Azeotropic Composition | PARALOID™ B-66 (10% by wt.) | PARALOID™ B-72 (10% by wt.) | DER™ 331 (10% by wt.) |
|---|---|---|---|
| 20% XIAMETER™ PMX-200 80% 1-methoxy-2-propylacetate | Soluble | Soluble | Soluble |
| 20% XIAMETER™ PMX-200 80% 1-propoxy-2-propanol | Soluble | Soluble | Soluble |
| 50% XIAMETER™ PMX-200 50% 1-propoxy-2-propanol | Insoluble | Insoluble | Soluble |
| 50% XIAMETER™ PMX-200 50% 2-propoxyethanol | Insoluble | Insoluble | Soluble |
| 20% XIAMETER™ PMX-200 80% 2-propoxyethanol | Soluble | Soluble | Soluble |
| 20% XIAMETER™ PMX-200 80% amyl acetate | Soluble | Soluble | Soluble |

As shown above, depending on the specific blend and resin evaluated, resin solubility is observed in blends containing 20-50% of the octamethyltrisiloxane. This demonstrated the potential use of low VOC azeotropic blends as solvents with common resins used in coating compositions.

We claim:

1. An azeotropic blend or a pseudoazeotropic blend consisting essentially of octamethyltrisiloxane and a second component selected from the following:
   amyl acetate at a percent by weight in a range of 50 wt % to 80 wt %,
   2-propoxyethanol at a percent by weight in a range of 20 wt % to 80 wt %,
   1-methoxy-2-propylacetate at a percent by weight of 80 wt % or greater, and
   1-propoxy-2-propanol at a percent by weight in a range of 50 wt % to 80 wt %;
   wherein the boiling point of the blend is less than the boiling point of both of octamethytrisiloxane and the second component.

2. The blend of claim 1, wherein the second component is amyl acetate.

3. The blend of claim 1, wherein the second component is 2-propoxyethanol.

4. The blend of claim 1, wherein the second component is 1-methoxy-2-propylacetate.

5. The blend of claim 1, wherein the second component is 1-propoxy-2-propanol.

6. A coating composition comprising the azeotropic blend or pseudoazetropic blend of claim 1.

* * * * *